United States Patent
Holden et al.

(10) Patent No.: US 8,625,731 B2
(45) Date of Patent: Jan. 7, 2014

(54) COMPACT NEUTRON GENERATOR FOR MEDICAL AND COMMERCIAL ISOTOPE PRODUCTION, FISSION PRODUCT PURIFICATION AND CONTROLLED GAMMA REACTIONS FOR DIRECT ELECTRIC POWER GENERATION

(76) Inventors: Charles S. Holden, San Francisco, CA (US); Robert E. Schenter, Portland, OR (US)

( * ) Notice: Subject to any disclaimer, the term of this patent is extended or adjusted under 35 U.S.C. 154(b) by 961 days.

(21) Appl. No.: 12/296,844

(22) PCT Filed: Apr. 13, 2007

(86) PCT No.: PCT/US2007/066668
§ 371 (c)(1),
(2), (4) Date: Oct. 10, 2008

(87) PCT Pub. No.: WO2008/060663
PCT Pub. Date: May 22, 2008

(65) Prior Publication Data
US 2011/0268237 A1     Nov. 3, 2011

Related U.S. Application Data

(60) Provisional application No. 60/792,065, filed on Apr. 14, 2006, provisional application No. 60/792,066, filed on Apr. 14, 2006, provisional application No. 60/792,067, filed on Apr. 14, 2006, provisional application No. 60/805,541, filed on Jun. 22, 2006.

(51) Int. Cl.
*G21G 4/02* (2006.01)
*G21G 4/00* (2006.01)

(52) U.S. Cl.
USPC ............................ 376/108; 376/112; 376/156

(58) Field of Classification Search
USPC .................... 376/157, 108, 156, 171, 172
See application file for complete search history.

(56) References Cited

U.S. PATENT DOCUMENTS

| | | | | | |
|---|---|---|---|---|---|
| 3,748,226 | A | * | 7/1973 | Ribe et al. ................. | 376/124 |
| 3,778,627 | A | * | 12/1973 | Carpenter .................. | 376/192 |
| 4,749,540 | A | * | 6/1988 | Bogart et al. .............. | 376/133 |
| 4,997,619 | A | * | 3/1991 | Pettus ........................ | 376/288 |
| 2004/0228433 | A1 | * | 11/2004 | Magill et al. .............. | 376/347 |
| 2005/0220248 | A1 | * | 10/2005 | Ritter ......................... | 376/190 |
| 2008/0144762 | A1 | * | 6/2008 | Holden et al. ............. | 376/416 |

* cited by examiner

*Primary Examiner* — Jack W Keith
*Assistant Examiner* — Sean P Burke
(74) *Attorney, Agent, or Firm* — Craig M. Stainbrook; Stainbrook & Stainbrook, LLP

(57) ABSTRACT

A neutron generator and isotope production apparatus and method of using the same to produce commercially and medically useful neutrons. The gamma,n reaction produces neutrons in beryllium and deuterium and the spectrum of the neutrons generated is shaped to optimize capture of the neutrons in a gamma emitting isotope. The gammas interact with target materials to produce large quantities of neutrons.

14 Claims, 3 Drawing Sheets

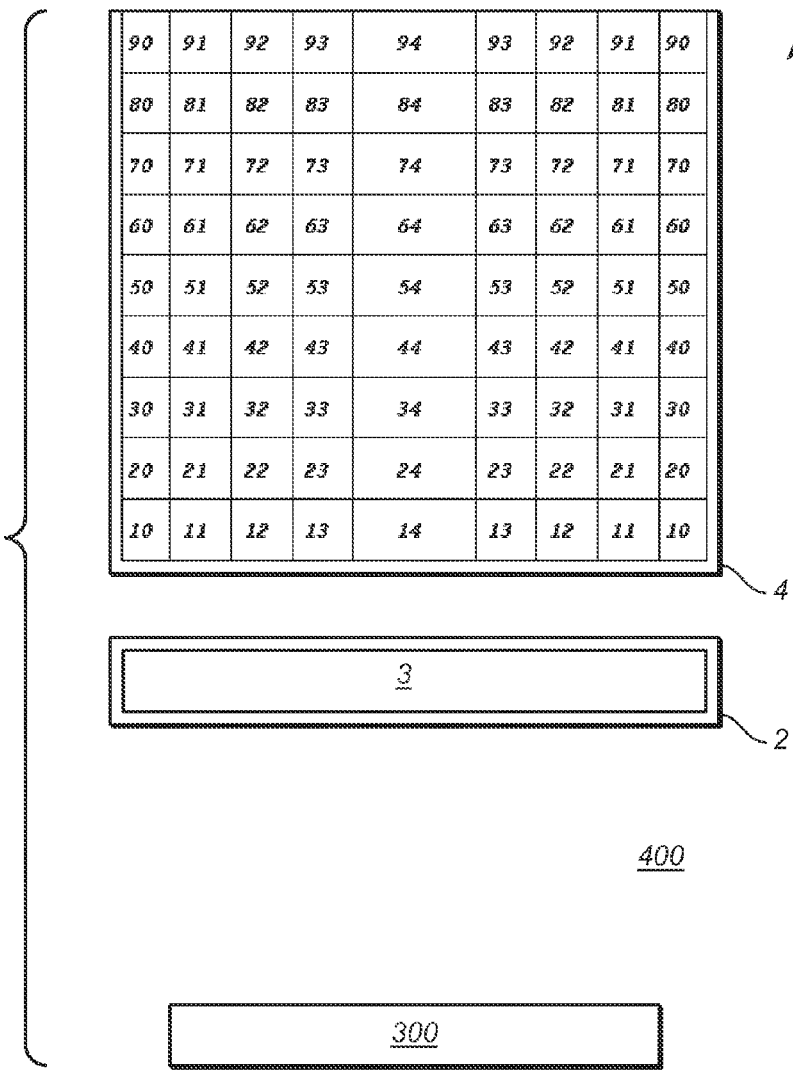
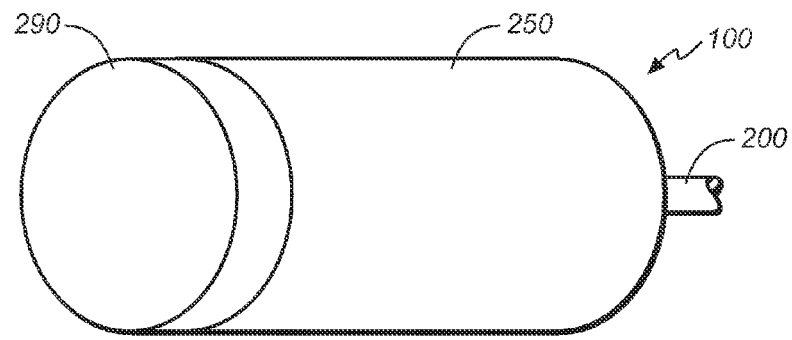

COMPACT NEUTRON GENERATOR FOR MEDICAL AND COMMERCIAL ISOTOPE PRODUCTION, FISSION PRODUCT PURIFICATION AND CONTROLLED GAMMA REACTIONS FOR DIRECT ELECTRIC POWER GENERATION

BACKGROUND OF THE INVENTION

1. Technical Field

The present invention relates generally to a novel method for producing neutrons in a controlled manner in a novel type of neutron generator, and more particularly to a novel method and apparatus for producing commercially and medically useful isotopes by transmuting selected precursor isotopes using gamma radiation.

2. Background Art

It is well known that neutrons produce valuable isotopes used in scientific research, manufacturing, and medicine. Radioactive isotopes are employed in scientific research in fields as diverse as hydrology and life sciences. Isotopes are used in business and commerce in many manufacturing process and in the production of oil and gas. The most valuable, yet some of the most difficult to make isotopes, are used in the diagnosis and treatment of human diseases and disorders.

It is also well known that fission in nuclear reactors produces fission products that are a component of nuclear waste.

Isotopes are currently produced by electron beams, ion beams, in cyclotrons and in nuclear reactors. Some isotopes may be produced by any of the four general methods. Others by one method alone. The science of isotope production involves adding or subtracting the requisite number of nucleons (protons or neutrons) to or from the target's parent isotope to produce the desired end product in significant quantities with appropriate purity.

The transmutation reactions that change the number of protons or neutrons in the isotopes include photo nuclear reactions wherein energetic gamma photons eject neutrons from nuclei. Also high energy neutrons are able to displace or eject protons from nuclei. Transmutation reactions caused by accelerated ions such as protons, deuterons, helium nuclei and other ions collide with the nuclei of the target material to change the isotope from one to another. These reactions generally do not yield the quantity of desired product material as efficiently as reactions involving successive or singular neutron capture in the nuclear reactor. The above mentioned reactions also are not as efficient in the treatment of fission products to transmuted them to shorter lived isotopes or common stable isotopes.

DISCLOSURE OF INVENTION

The present invention relates to an inventive compact neutron generator and isotope production apparatus and method of using the apparatus to produce copious amounts of commercially and medically useful neutrons. The gamma,n reaction produces the neutrons in beryllium and deuterium as well as high-Z materials such as bismuth, lead, thorium and uranium. The produced neutrons from gamma n reactions are moderated or their spectrum is shaped so that the capture of neutrons in the target isotope is maximized.

The present invention advances the art by employing alloys fashioned from materials that emit energetic gamma radiation to obviate the use of a reactor or a cyclotron for these applications when stimulated by high energy electrons.

The novel method disclosed herein takes advantage of the energetic gamma radiation emitted from isotopes of nickel, vanadium, iron and other high gamma emitting materials after one or successive neutron captures or from gamma,n reactions on high-z materials such as bismuth, lead, thorium and uranium.

For the purpose of this application the thermal energy region is defined as $1/1000$ electron volts to $5/10$ electron volts, the epi thermal energy region as $5/10$ electron volts to 5000 electron volts, the fast energy region as five thousand electron volts (five kilo electron volts, 5 keV) to one million electron volts (1 MeV) and the high energy region as above one million electron volts (1 MeV) and in some cases in excess of ten million electron volts (10 MeV).

The novel neutron generator of the present invention uses gamma photons to dissociate nuclei of beryllium and/or deuterium or to produce neutrons from bismuth, lead, thorium or uranium. The apparatus is best summarily described as a photo nuclear neutron generator and isotope producer. Using the inventive apparatus, gamma photons are produced in various alloys or compounds of gamma emitting isotopes. Exemplary gamma emitting isotopes that function by neutron capture include, but are not limited to: vanadium-50, vanadium-51, nickel-59, nickel-61, iron-57, iron-54, erbium-167, europium-151 europium-153, gadolinium-155, gadolinium-157, bromine-79, palladium-105, palladium-107, and others being high-z refractory materials such as tantalum, tungsten, rhenium and niobium functioning as a "converter" in which energetic electrons are slowed down and emit penetrating and energy gamma photons.

The inventive photo nuclear neutron generator is a very compact "plug-in" neutron generator that obviates the need for large reactors to produce neutrons for several applications and uses including: (1) production of therapeutic medical isotopes and other important isotopes used for the treatment or diagnosis of disease or for the production of other commercially significant isotopes, (2) production of penetrating gamma radiation for industrial applications; (3) production of neutrons for the waste treatment of fission products from spent light water reactor fuel to convert the fission products to shorter lived or stable isotopes; (4)) for motive power applications and (5) the gamma photons can also transmute matter by ejecting neutrons from nuclei to accomplish transmutations with the same results and purpose as the aforesaid four applications and uses.

There has thus been broadly outlined the more important features of the invention in order that the detailed description that follows may be better understood, and in order that the present contribution to the art may be better appreciated. Additional objects, advantages and novel features of the invention will be set forth in part in the description as follows, and in part will become apparent to those skilled in the art upon examination of the following.

Furthermore, such objects, advantages and features may be learned by practice of the invention, or may be realized and attained by means of the instrumentalities and combinations particularly pointed out in the appended claims.

Still other objects and advantages of the present invention will become readily apparent to those skilled in this art from the following detailed description, which shows and describes only the preferred embodiments of the invention, simply by way of illustration of the best mode now contemplated of carrying out the invention. As will be realized, the invention is capable of modification in various obvious respects without departing from the invention. Accordingly, the drawings and description of the preferred embodiments are to be regarded as illustrative in nature, and not as restrictive.

BRIEF DESCRIPTION OF THE DRAWINGS

This invention will be better understood and objects other than those set forth above will become apparent when consideration is given to the following detailed description thereof. Such description makes reference to the annexed drawings wherein:

FIG. 1 is a schematic view showing a first preferred embodiment (i.e., a two chamber design) of the neutron generator/isotope production apparatus of the present invention;

FIG. 2 is a perspective view of the compound target assembly (or "capsule") employed in a second preferred embodiment of the neutron generator apparatus of the present invention;

BEST MODE FOR CARRYING OUT THE INVENTION

Figure 3:
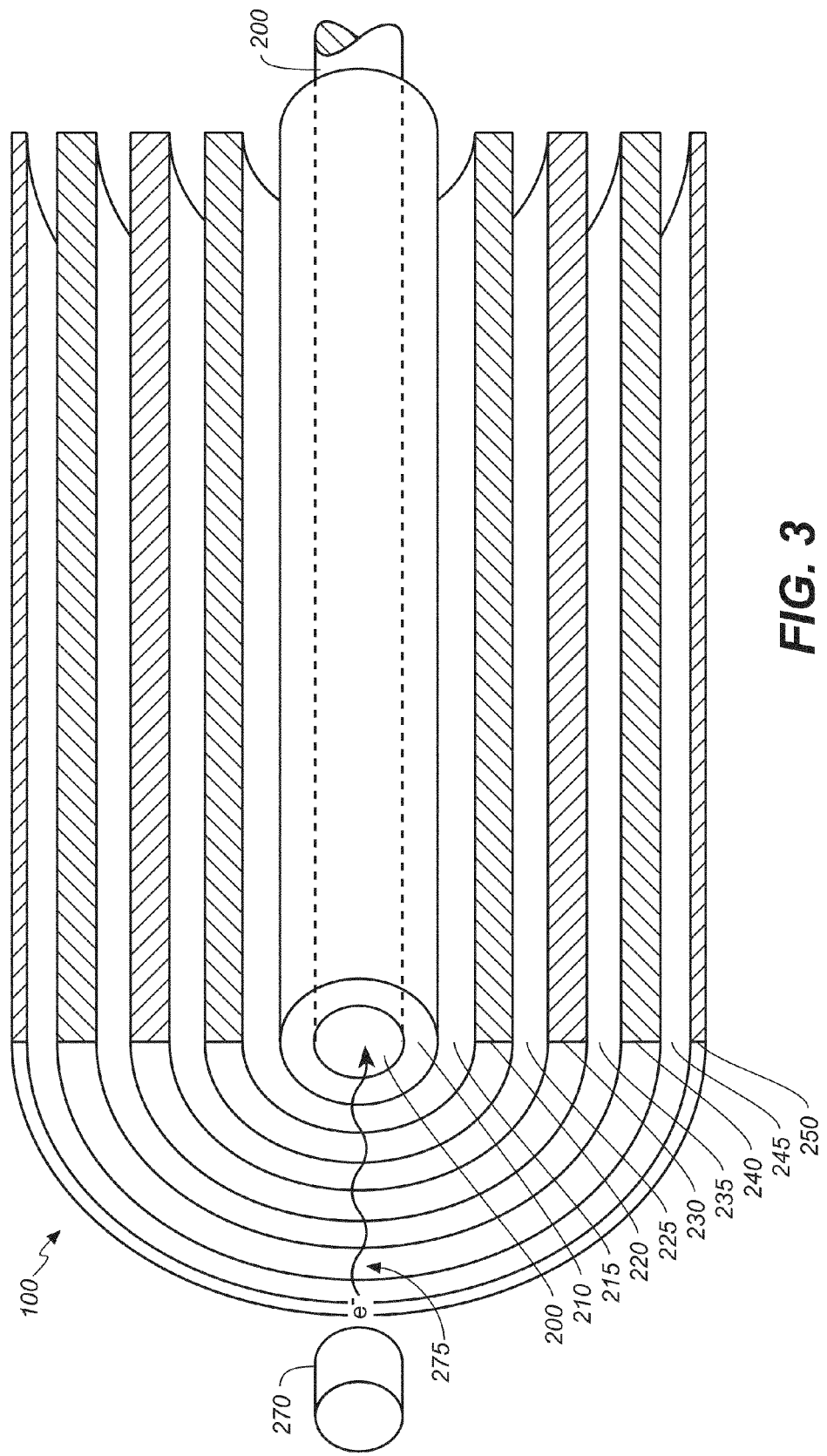
FIG. 3 is top cross-sectional perspective view thereof.
Figure 4:
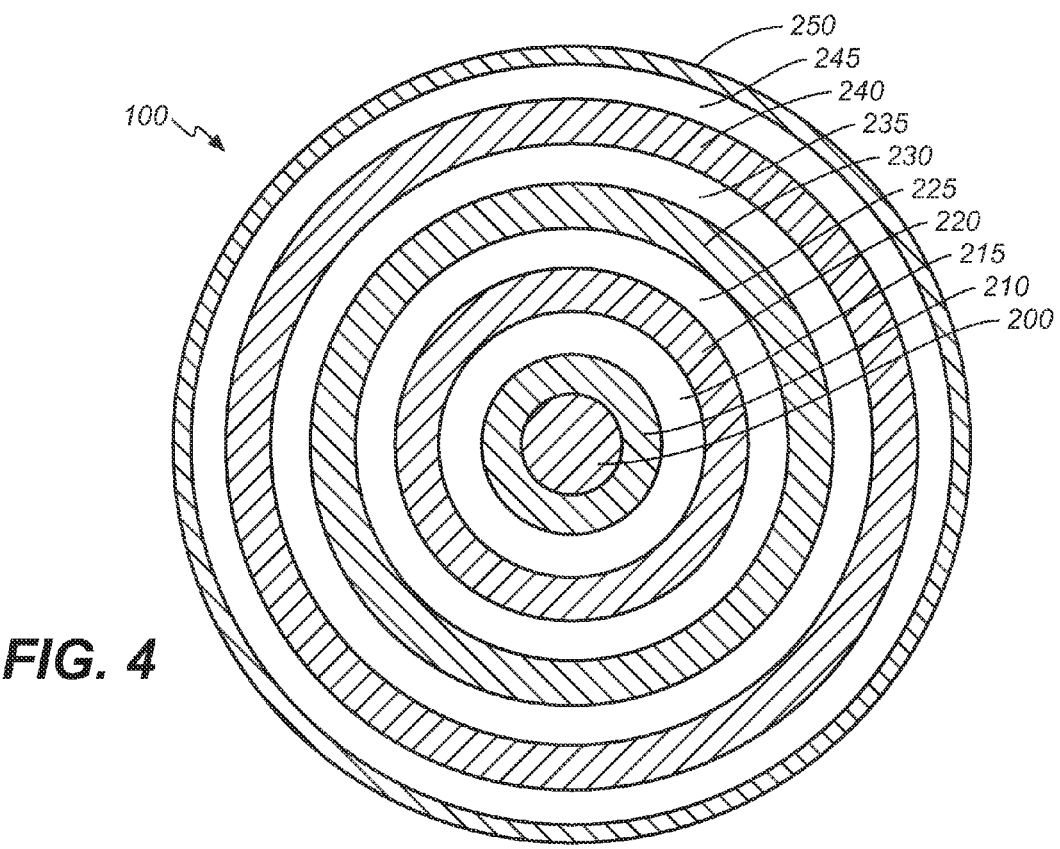
FIG. 4 is a cross-sectional end view in elevation of the target assembly of FIGS. 2 and 3.

Referring to FIGS. 1 through 5, wherein like reference numerals refer to like components in the various views, wherein FIG. 1 is a schematic view showing a first preferred embodiment of the neutron generator and isotope production apparatus of the present invention. This view shows that an exemplary embodiment 100 includes an electron beam source 300 which directs an electron beam, preferably 10 mA, between 16 and 32 MeV, to a first chamber, which is a converter cell. The converter cell preferably comprises a hollow rectangular 2 mm tungsten alloy channel or tube 1 with an interior void 2 through which cooling water or other working fluid such as helium, carbon dioxide, or selected liquid metal or alloy of liquid metals as may be continually circulated to export heat and enable long term operation of the system. While tungsten alloy is the preferred alloy material, alloys of other refractory metals, such as rhenium, niobium and or tantalum, or any combination thereof as computationally optimized, may be employed. The electron beam source is separated from the converter cell by dry air 400, which surrounds the two chambers.

The system next includes a second chamber 4, which contains one or more target isotopes, and the volume of target isotope may be demised into a plurality of cells 10-13, 20-23, 30-33, 40-43, 50-53, 60-63, 70-73, 80-83, and 90-93, which receive various amounts of exposure to gamma rays at various energies. The energy dependent photon fluence may be calculated for each zone.

FIGS. 2-5 show a compound target assembly of a second preferred embodiment of the inventive compact neutron generator and isotope production apparatus of the present invention, showing the target assembly 100, including a central power rod 200, preferably consisting of high-Z x-ray emitting material such as lead bismuth eutectic, and even more preferably spiked with fissile material or neutron multiplying material. This is disposed in an inner tube of spectrum shaping material, preferably a gamma emitting erbium-167-nickel cup 210. The cup may be cooled by heavy water pumped through channels 215, exterior to the cup, as shown.

Axially disposed around the inner tube of spectrum shaping material (and preferably spaced apart therefrom) is a ring or tube of precursor isotope target material 220, in either ring, tube, or foil form. This is followed by an outer ring of spectrum shaping alloy 230, and an outer ring of neutron multiplying target material 240 or gamma converting material. An optional reflector 250 may be axially disposed around the outer ring of neutron multiplying target material in order to reflect second generation neutrons back to the target to drive fission reactions. The reflector is preferably fabricated from beryllium, beryllium deuteride, beryllium triteride, or heavy water producing thermalised neutrons.

Channels 215, 225, 235, 245, may be disposed around and between each of the material layers and provided with circulated air or heavy water to cool each layer of the target assembly. Alternatively, in embodiments where cooling is either not desired or not needed, the channels may be eliminated and each material layer (ring or tube) disposed immediately upon and approximated to the underlying material layer (ring, tube, or rod).

Figure 5:
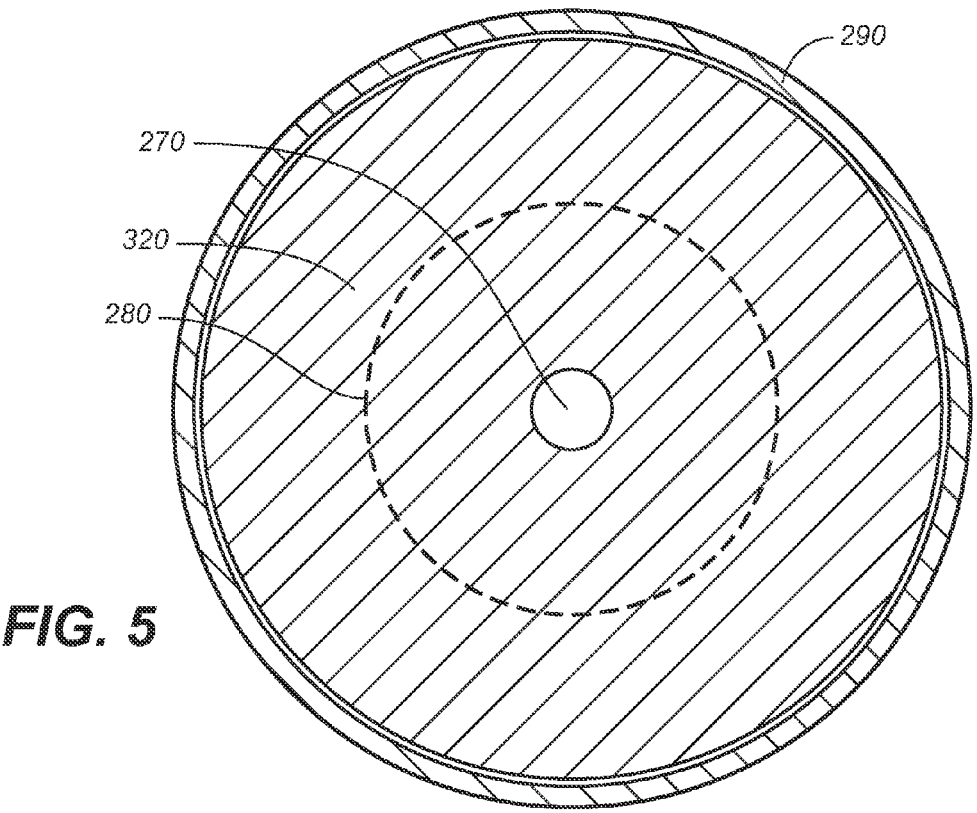
FIG. 5 is a cross-sectional end view in elevation of the central neutron generator cavity showing structure where the electron accelerator tube is attached to an electronics package and further showing the gamma generating alloy forming the cup and the selected target material for the gamma,n reaction.

FIG. 5 is a cross sectional end view in elevation of the central neutron generator cavity where the capsule is attached to an electronics package 270, and showing the relative position of gamma generating alloy forming the cup 280 and selected target material 290 for the gamma,n reaction.

The gamma emitting assembly of the photo nuclear neutron generator of the present invention has unique design characteristics. There are common elements to the preferred embodiments of the present invention. The first common element is the use of neutron multiplication in by elevating the intensity of cascades of gammas in two or more volumes (200, 240) within the compound target assembly 100 shown in the diagrams and/or figures. The x-ray source is depicted as a tube or rod 200 in the central axis of the cylindrical electron or particle accelerator.

The second element common to all of the preferred embodiments is the use of a spectrum shaping gamma emitting alloy disposed proximate the neutron multiplying target. These are "cups" 210 of gamma emitting alloy that "hold" or surround the LBE. These cups are preferably jacketed and cooled by heavy water pumped through a channel 215 that also contributes neutrons to the central area of the target. The gamma emitting alloy 210 includes spectrum shaping additives that soften the high energy spectrum to an epithermal or thermal neutron spectrum as needed to promote the most efficient capture in the selected isotopes comprising the gamma emitting alloy.

In the preferred embodiments, the metal matrix for shaping the neutron spectrum is composed of vanadium nickel erbium europium or other selected lanthanide(s) that are computationally optimized. Aluminum has low parasitic neutron absorption cross-section, and nickel has high elastic scattering cross-section. Other metals of the alloy such as vanadium or zirconium have unique neutronic properties so these can be added to improve neutronic behaviors in the spectrum shaping matrix that assists capture in the gamma producing alloy.

The hydrogen atoms in the hydrides function to soften neutron spectrum to its optimal shape for transmutations that produce gamma radiation. The metals that form the intermetalic deuteride compounds include yttrium, europium, gadolinium, erbium, ytterbium, zirconium, vanadium, and titanium. Additionally, various oxides are known to shape or tailor neutron spectra. These include zirconia, alumina, and lithia-7. Finally carbide compounds and nitrides as homogeneously dispersed fine particles can be used with the hydrides to assist in slowing neutrons down in aluminum alloys. All of the additives are fine powders that are homogeneously dispersed in the alloy.

The photo nuclear neutron generator can be configured to produce more than one medical isotope at a time and can also be used to produce electrical energy. The device can produce many Positron Emission Tomography (PET) Isotopes, various longer lived positron emitting isotopes, and actinium-225 and many other useful isotopes by the gamma,n reaction. Further, long lived fission products, mid Z isotopes can be transmuted to shorter lived isotopes or to stable isotopes as a method of the treatment of nuclear waste using this type of neutron generator/neutron ejector.

When the purpose of the inventive neutron generator is to produce useful amounts of electrical energy for motive applications, then the materials interacting with the gammas would be selected to produce gamma,2n reactions to multiply the number of neutrons producing gamma photons. These gammas do not have to be highly energetic so that the selected lanthanides can provide much of the mass of the gamma emitting alloy and the lanthanide such as erbium-167 has a high affinity for neutrons having thermal energies. This apparatus is called the Photo Nuclear Neutron Generator. For this embodiment matter which most easily "ejects" neutrons (beryllium, deuterium, bismuth, lead, thorium, uranium, for example) is illuminated with energetic gamma radiation generated from neutron captures in electron slowing down reactions or from neutron capture in vanadium 50 and 51 nickel 61 or similar isotopes with the selected lanthanides disclosed in paragraph one above. These isotopes have the attribute of emitting energetic gamma photons above the five million electron volt level. These gammas interact with neutron shedding matter to cause a gamma,2n reaction in beryllium and in deuterium or in lead. For the effect to take place in beryllium the incident photon must have energy in excess of 1.67 MeV. For deuterium the energy must be in excess of 2.24 MeV. The cross-section is much higher for the high-z materials such as lead, bismuth, thorium and uranium although the threshold energy must be over 8 or so MeV. These energies are the binding energy for the least bound neutrons in found in nature. Further particle collisions with these materials will also cause neutrons to be produced by the n,2n reaction as well as from the electron generated gamma,n reactions. The novel idea includes the use of gamma emitting isotopes to produce energetic gamma radiation in combination with gamma produced from energetic electrons. The gamma photons are energetic enough to cause neutrons to be ejected from the nuclei of common isotopes, fluorine-19, nitrogen-14 for example to produce positron emitting isotopes, fluorine-18 and nitrogen-13 for example in commercial quantities as well as other valuable isotopes including actinium-225 by means of the gamma,n reaction. The gamma emitting alloy is engineered computationally to slow neutrons down to epithermal energies where captures are most likely in the gamma emitting alloy, containing vanadium-50 and nickel-61 and others like this one that emit energetic photons. The target for the production of isotopes is the selected common isotope and precursor material for each of the desired positron emitting isotopes to be produced.

As noted, the spectrum shaping alloy material facilitates efficient neutron capture by the gamma emitting isotope in the selected resonance energy regions. This maximizes the production of the desired gammas of high intensity. The spectrum shaping material can be a hydrided or deuterated alloy or an oxide strengthened alloy or an alloy containing carbides, nitrides or other neutron scattering material that shapes or tailors the spectrum appropriately, each spectrum shaping alloy being specifically formulated to shape or tailor the spectrum to maximize production of gammas in the selected gamma emitting isotope. One particularly effective scattering alloy is composed of very fine particles of boron tetra carbide ($B_4C$) dispersed in aluminum silumen or vanadium-nickel, aluminum zirconium alloys. This scattering alloy functions as a moderator and allows neutrons to be slowed in a controlled manner so that they reach the reduced energy needed for effective capture in the selected gamma emitting isotope.

The scattering materials are preferably low Z ceramics boron tetra carbide ($B_4C$) with the boron as boron-11, lithium-7 boride (with the boron as boron-11), lithium-7 nitride, and boron nitride (with the boron as boron-11). These are low-Z materials with low neutron capture and they can be combined with hydrides of zirconium, titanium, vanadium, lithium to provide spectrum softening effects to optimize the spectrum for capture. For increasing the probabilities of the gamma,n reaction, the shaping alloy can be nickel aluminum, $Ni_3Al$, with zirconium hydride. The main alloy matrix employed to produce the gammas is $Er_3Ni$, in which the erbium is erbium-167.

Using the inventive method, neutrons can be generated using a high energy electron beam 275 that interacts with a liquid lead bismuth eutectic (LBE). The LBE is either spiked with particles of fissile uranium-233, uranium-235 and/or plutonium-239 alloyed with optimized amounts of beryllium, or it is not spiked with fissile material but is instead alloyed with beryllium. Spiking with fissile material will increase neutron production provided there is sufficient spectrum shaping material present. to moderate the produced neutrons to thermal energies with the highest cross-sections for n, fission reactions. The incident electrons produce energetic x-rays in the gamma ranges of the electromagnetic spectrum from interactions with the high-Z materials comprising the LBE, lead bismuth eutectic that may also contain thorium, uranium and one or more selected fissile isotopes such as uranium-233, uranium-235 or plutonium-239 or plutonium-241. These gammas are energetic enough to photo-dissociate nuclei of beryllium, deuterium and tritium as well as the high-z isotopes of lead bismuth, thorium and or uranium. The first generation neutrons produced from the interactions of the electron beam with the spiked LBE or non-spiked LBE, can be moderated to a thermal spectrum by spectrum shaping alloys, and after moderation are most likely to interact with selected fissile material by neutron capture and fission. Second generation neutrons are produced by fission are energetic and will escape the liquid target area without interacting with the fissile material in the target and without interacting with the LBE. Some of second generation neutrons can be reflected back to the target by the reflector made of beryllium, beryllium deuteride, beryllium triteride, or heavy water producing thermalised neutrons to drive fission reactions in the spiked LBE embodiment. The reflected second generation neutrons become low energy neutrons and will interact with the fissile material in the target with high probability. The reaction set will amplify without becoming critical because the amplification is dependent upon continuous input of gamma radiation from the electron beam, because the fissile mass is non-critical and the geometry is well considered when the mass and density of the selected fissile material(s) in the metal matrix is sufficient.

Additional gammas are provided by the interior of the target containing the spiked or unspiked LBE. The part of the target that surrounds the LBE is comprised of erbium-nickel alloy which emits energetic and penetrating gamma radiation in excess of 8 MeV for each neutron captured by each erbium-167 nuclei. This alloy is also an excellent conductor of heat to provide cooling for the LBE. More energetic gammas are provided by the capture in erbium-167 than what is produced by the electron beams. The gammas from erbium-167 are energetic enough to photo-dissociate more than one nuclei of beryllium, deuterium or tritium that may be encountered.

Also the erbium-nickel "cup" that holds the LBE has heavy water circulating in it. Heat is generated from the electron beam and from fission in the target. Heat is removed by pumping heavy water through the vanadium-erbium-nickel alloy that functions as the structural material to hold the spiked or unspiked LBE. Since erbium nickel is an excellent conductor of heat and since the working fluid for heat transport is heavy water, D2O, heat is managed well and additional neutrons are produced via gamma,n reactions from the D2O. The heavy water is pumped through the interior element of the target to transport heat to the heat exchanger outside of the apparatus to keep the operating temperature of the neutron generator within satisfactory ranges.

Each embodiment of the invention discloses the novel apparatus that produces significant quantities of neutrons outside of the conventional nuclear reactor or neutron generators using fusion reactions of tritium and deuterium, or using alpha emitters on beryllium. The produced neutrons can be used to transmute isotopes using the n,2 reaction, the n,3n reaction and or the gamma,n reaction. Further, significant amounts of gamma radiation for direct conversion to direct current is available. The neutrons or the produced gamma radiation could be used to transmute many unstable isotopes commonly known as "fission products" to shorter lived radioactive isotopes or to stable non-radioactive isotopes. Numerous medical and commercial isotopes, especially the positron emitting isotopes, can be produced using the gamma,n reaction. Energetic gammas eject neutrons from the nuclei of target isotopes to make important future commercial medical isotopes. The gamma photons can produce a usable electric current by the photoelectric effect for direct electrical production in other embodiments.

Depending on the application, this device produces neutrons up to $5 \times 10^{14}$ (5×10sup.14) neutrons per second with about 250 kilowatts of thermal output that is managed by the cooling system. These neutrons have a different spectrum than the thermal or fast fission spectra. Copious high energy neutrons are produced with a significant population above eight million electron volts (8 MeV). The output of the neutrons can be modulated by changing the pulse rate of the electron beam so that as fewer pulses per second occur, to reduce the neutron production rate. Cooling is achieved by circulating heavy water or other selected coolants through the interior of the target, specifically the vanadium-erbium-nickel alloy that readily absorbs neutrons, conducts heat well and provides high energy gamma radiation in return.

The structural components of the target preferably comprise a vanadium-nickel-erbium alloy which transfers heat efficiently and from which energetic and penetrating gamma radiation is produced when neutrons are captured. This gamma radiation is produced from thermal epithermal neutron capture in erbium-167 for the most part. These gammas are energetic enough to photo dissociate neutrons from nuclei of beryllium or deuterium. These photo produced neutrons will be in the thermal spectrum and will cause uranium-233, uranium-235, plutonium-239, or americium-243m to fission. These produce fission spectrum neutrons that are too energetic to cause a chain reaction and they escape from the target compartment(s) containing the selected fissile materials.

The embodiments of this neutron generator include transportable devices that are electrically energized; allowing neutron production to cease shortly after the generator's electron beam is de-energized. The first generation neutrons are produced in the target from energetic x-rays above 5 MeV by the displaced electrons in the high-Z, LBE or LBE containing thorium and uranium spikes also with spectrum shaping alloys and computationally optimized amounts of fissile material. Additional neutrons can be produced in a surrounding the sub-critical assembly. The generator will not sustain a nuclear chain reaction because the fissile materials are carefully distributed and are too low of mass to support an uncontrolled chain reaction. The device is activated electrically so that the produced stream of neutrons can be conveniently turned on and off to suit the needs of the application.

The electron beam area of the neutron generator consists of an evacuated tube made from a commercially available components. At the top end of the evacuated tube the electrons or alpha particles are gathered, excited and are accelerated by the electronic package to the target. The electrons or alpha ions are accelerated in the evacuated tube by electrostatic field effects, electrical effects and/or magnetic means to a high velocity near 99.99c (99.99% of the speed of light). The energy of the electron beam should be between two and four times the Giant Resonance region of the targeted material for the gamma,n reaction to occur within that material. Beryllium and deuterium have the lowest gamma,n threshold energies known, 1.67 MeV and 2.24 MeV respectively. The Giant Resonance energy region for these reactions in these materials spans energies of 2.0 million electron volts (2.0 MeV) to ten million electron volts (10 MeV). Electrons having a velocity of 99.99c have an energy of ten million electron volts (10 MeV).

At the bottom end of the evacuated beam tube, the 10 MeV electron beam interacts with the target matter the selected converter alloy of refractory elements, tantalum, tungsten rhenium and niobium or the beam interacts with high-Z materials, lead, bismuth, thorium and uranium with optimized amounts of selected fissile materials comprising the spiked LBE. In all embodiments there is a subcritical mass, density and geometry when the LBE is spiked with fissile material as set out above in another embodiment and in the preferred embodiment High-Z bismuth lead eutectic is used with out fissile material, with a low Z neutron source materials such as beryllium in the LBE target and deuterium in the heavy water coolant to provide the neutrons in response to the gamma photons produced from the activated electron beam or from the vanadium-50-nickel-58-erbium-167 alloy or from palladium-105 and palladium-107 deuteride in compartments in the target assembly.

When alpha particles are used at high enough energy, spallation neutrons are produced from the LBE. These neutrons interact with the gamma emitting alloys. This embodiment of the neutron generator can produce its neutrons from powdered beryllium dispersed in an aluminum "lamp shade" surrounding the exterior of the generator with out the need for the use of fissile materials in the generator. An aluminum clad powdered beryllium "lampshade" would reflect neutrons from the interior to sustain production of energetic gammas in the erbium alloy driving photo-dissociation reactions in the beryllium powder portion of the "lamp shade."

The electronics package 270 contemplates the use of any suitably charged particles: electrons, protons, deuterons and alpha particles, depending on the application and the effectiveness of each charged particle to produce the desired reaction. The target generates the neutrons upon stimulation from bombardment of the relativistic electrons after the electrons are converted to x-rays and after the x-rays interact with deuterium and beryllium. The LBE spiked target is uranium-235, uranium-233 or plutonium-239, plutonium-241 or americium-243, or any combination thereof (as the fissile neutron source) with, beryllium, deuterium or tritium, or a combination thereof (as the non-fissile neutron source) in one embodiment. The target geometry and target mass are calculated computationally, optimized and engineered so that the target assembly and its components are highly sub-critical at all times.

The accelerated electrons interact with the high-Z materials, uranium, plutonium or americium to produce energetic x-rays or in the preferred embodiment to produce x-rays in a lead bismuth eutectic. These x-rays are powerful enough to dissociate beryllium nuclei by the gamma,n reaction when the emitted energy is above 1.67 MeV. The target may include a chamber containing beryllium di-deuteride or lithium beryllium tri-deuteride and tri-triteride or palladium deuteride. The gammas produced from the electron beam will dissociate deuterium nuclei (as well as the beryllium nuclei) by the gamma,n reaction when the energy of the gamma is above 2.24 MeV. Higher energy gammas will be produced by capture reactions in the target where neutrons are captured by erbium-167. These gammas exceed 6 MeV which can photo dissociate more than one nuclei of beryllium or deuterium but will interact with high-z materials such as lead, bismuth, thorium and uranium to produce neutrons more efficiently.

To recapitulate and further clarify the teaching of this disclosure: There are three energy "generations" for the neutrons produced by the target and four energy "generations" of gammas.

The first generation neutrons are produced by the gamma,n reaction as a consequence of the high energy electron beam interacting with the converter material and high-z target such as lead, bismuth, thorium or uranium.

The second generation neutrons are produced from fission in one embodiment.

The second or third generation neutrons, depending on the presence or absence of fissile material in the target, are from the higher energy gamma,n reactions from erbium, nickel and vanadium acting on high-Z materials, lead, bismuth, thorium and uranium. The gammas are from the electron beam and from neutron capture in erbium, nickel and vanadium. Each has its characteristic wavelength. These gammas cause photo dissociation in the heavy water coolant as well, in compartments containing either beryllium or deuterium and in the exterior beryllium-containing aluminum lampshade.

The first generation neutrons, those produced by the incident accelerated particles, have energy in or near the thermal neutron range. These primary neutrons will interact with the nuclei of the fissile materials and will cause the fissile material in the target to fission with known probabilities in one embodiment. The resulting fissioning will produce energetic neutrons and fission fragments. Some of these neutrons will escape from the target and others will interact with the beryllium nuclei to either produce additional neutrons or will be thermalised to be captured by fissile materials and cause fission with a K eff below 1. The liquid metal alloy comprising the beam target is electrically conductive so that the electron beam can be maintained indefinitely. The LBE target is arrayed like a wick inside a candle made from thoria-containing zirconium hydride or other refractory material. The tube of electrically insulating material surrounds the target at the down end of the evacuated tube and the down end comprised of the vanadium-nickel-erbium alloy that holds the liquid metal LBE, as if it were a deep cup. The target is cooled by circulating heavy water through the deep cup comprising the gamma emitting alloy. This provides for the production of gammas boosting the yield from the electron input.

The deuterium in the coolant circulating through the deep cup provides additional neutrons from the gamma,n reactions. These neutrons will be captured by erbium in the target to produce energetic gamma photons sufficient to effectively dissociate nuclei of deuterium and beryllium positioned outside of the target. These materials "shed" neutrons when exposed to high energy gamma radiation. The "shed neutrons" are the product of the generator and escape the target area. These can be captured by a covering of gamma emitting isotopes for the production of medical isotopes placed outside of the beryllium lampshade. If power is to be produced, the covering of gamma emitting isotopes is, in turn, covered by photo electric materials that produce a direct current from the gamma photons like cadmium-tellurium, cadmium zinc tellurium, cesium iodide thallium plus silicon. A different embodiment of the neutron generator is used for the production of commercial or medical isotopes by the use of the gamma,neutron reaction. The generator neutrons are captured outside of the target by the gamma emitting target comprised of isotopes such as vanadium-50 vanadium-51, nickel-58 and nickel-61 and erbium-167 that emit energetic and penetrating gamma radiation when neutrons are captured. These alloys are placed in close proximity to target isotopes and the transmutation reactions result as the gamma photons interact with nuclei of the target isotope by causing neutrons to be ejected from the nuclei of the targets.

All of the preferred embodiments of the neutron generator of the present invention employ isotopes that have large capture cross sections for neutrons and emit very energetic gamma photons. These include vanadium isotopes, vanadium-50 and vanadium-51 nickel isotopes, nickel-59 and nickel-61, the iron isotopes iron-57 and iron-54, europium isotopes europium-152 and europium-154, erbium isotopes including erbium-167, gadolinium isotopes and bromine isotopes. The nuclei of these isotopes emit very energetic gammas when neutrons are captured. These attributes allow alloys to be engineered from combinations of these isotopes and computationally optimized to produce cascades of penetrating gamma radiation that is useful for isotope production, electrical energy production and other national security applications. The vanadium isotopes, vanadium-50 and vanadium-51, produce gammas in excess of eleven million electron volts (11 MeV). The nickel isotopes, nickel-59 and nickel-61 produce photons whose energy is in excess of ten million electron volts (10 MeV). The europium isotopes produce photons whose energy in excess of eight million electron volts (8 MeV). Erbium produces gammas in excess of seven million electron volts (7 MeV). The iron isotopes provide energetic photons as do certain isotopes of palladium-105 palladium-107, bromine-79 and gadolinium-155 and gadolinium-157. Each neutron captured by the above mentioned isotopes of vanadium, nickel, palladium, bromine gadolinium, bromine and/or iron causes highly energetic gammas to be emitted from the nuclei. These gammas are penetrating and useful and the composition of the alloys can be optimized using these materials. The alloys comprising the invention, the gamma emitting alloys, will also contain materials that slow high energy neutrons produced from fission For example, vanadium-50, vanadium-51, nickel-59, nickel-61, iron-57 and iron-54 can be placed under a beryllium and lead shell that reflects produced neutrons back below the reflecting shell but allowing the gamma stream freely through the beryllium shell for applications outside of the neutron generator. On the inside of the inventive neutron generator in the central region proximate to the electron beam target is placed a layer of palladium, titanium, or erbium infused with tritium and deuterium. This matrix will generate secondary neutrons and will moderate fission spectrum neutrons.

Beryllium-9 dissociates into a neutron and two alpha particles when it is hit with an energetic neutron whose collision energy is more than 1.67 million electron volts or when (with less likelihood) the beryllium nuclei interact with a gamma photon having an energy of more than 1.67 million electron volts. Deuterium dissociates into a neutron and a proton when it is hit with an energetic neutron whose collision energy is more than 2.24 million electron volts. There will be an increase in the population of neutrons cause by the multiplication effects of the levels of energies of the gamma photons and the presence of fissile material in the target. This feedback will contribute to gamma production and may obviate the need for continual input of electrons from the beam to supply primary neutrons. Pulses may be more separated in time as the neutronic feed back effects increase the neutron production rate.

The various examples disclosed in this patent application are generally called embodiments of the neutron generator. The gamma,n effects will produce additional neutrons from target materials that are available for capture by the gamma emitting isotopes in the target. These neutrons will come from the beryllium nuclei or the deuterium or tritium nuclei or both. The neutrons will be slowed to the, epithermal and thermal energies where capture by the gamma emitting isotope is most probable or where fission is most probable.

The gamma emitter alloy contains vanadium-50, vanadium-51, nickel-59, nickel-61, iron-57 or iron-54, or bromine-79, and selected lanthanides such as europium and/or erbium that are deuterated or tritiated for secondary and/or tertiary neutron production.

The present invention considers the neutronic properties of the materials as well as the metallurgical aspects of the target alloy to optimize the production of neutrons for various functions adjacent to the generator.

Another potential use of the inventive neutron generator is for power production applications, i.e, for motive power from direct conversion of gamma photons to electrical power. The gamma photons stimulate the movement of electrons taking advantage of the photoelectric effects to convert the nuclear energy, the gamma radiation, directly to electrical energy for motive power or other purposes. The high energy gammas produce pairs of electrons and holes in selected materials. The distribution of the energies of the neutrons leaving the target is managed and controlled by the thickness of the neutrons' average traverse through the alloys comprising the target, the geometry of the shaping alloy and the neutron scattering and slowing down properties engineered into the shaping or tailoring alloy for energetic gamma production to make neutrons available outside the target. The target alloy will include two or more gamma emitters having markedly different neutron capture cross sections so that as the neutrons slow down they will have opportunity to interact by capture reactions in two or more gamma emitting isotopes. The lanthanides have the largest cross sections and will capture neutrons at lower energies very efficiently. The gammas produced will generate more neutrons from the neutron donor materials.

The action of an electron beam may be optimized in the alloy to produce secondary neutrons by particle interactions and by the photo nuclear effects caused by high energy gamma radiation.

Having fully described several embodiments of the present invention, many other equivalents and alternative embodiments will be apparent to those skilled in the art. These and other equivalents and alternatives are intended to be included within the scope of the present invention.

What is claimed as invention is:

1. A compact neutron generator, comprising:
   an electron beam source;
   a power rod at which an electron beam from said electron beam source is directed, said power rod including at least one neutron multiplying material;
   a target isotope;
   at least one neutron spectrum shaper disposed between said neutron multiplying material and said target isotope; and
   at least one cooling channel disposed around said at least one spectrum shaper and through which a coolant is pumped.

2. The apparatus of claim 1, wherein said power rod includes high-Z material.

3. The apparatus of claim 1, wherein said high-Z material is liquid lead bismuth eutectic.

4. The apparatus of claim 3, wherein said LBE is spiked with neutron multiplying material.

5. The apparatus of claim 1, including one neutron spectrum shaper, wherein said neutron spectrum shaper contains LBE.

6. The apparatus of claim 1, including first and second neutron multiplying materials, and first and second neutron spectrum shapers.

7. The apparatus of claim 6, wherein said generator is substantially cylindrical, and wherein said first neutron multiplying material is disposed in the general center of the cylinder, said first neutron spectrum shaper is axially disposed around said first neutron multiplying material, said target isotope is axially disposed around said first neutron spectrum shaper, said second neutron spectrum shaper is axially disposed around said target isotope, and said second neutron multiplying material is axially disposed around said second neutron spectrum shaper.

8. The apparatus of claim 7, further including a reflector axially disposed around said second neutron multiplying material so as to reflect second generation neutrons.

9. The apparatus of claim 7, further including one or more cooling channels disposed between one or more of said first and second neutron multiplying materials, said first and second neutron spectrum shapers, and said target isotope.

10. The apparatus of claim 7, further including a reflector axially disposed around said first and second neutron multiplying materials converters.

11. The neutron generator of claim 10, wherein said reflector is fabricated from a beryllium alloy.

12. The neutron generator of claim 11, wherein said beryllium alloy is beryllium deuteride.

13. The apparatus of claim 1, wherein said at least one neutron spectrum shaper includes a gamma emitting alloy that includes spectrum shaping additives for slowing high energy neutrons to energies in the epithermal or thermal neutron spectrum.

14. The apparatus of claim 13, wherein said neutron spectrum shaper includes a metal matrix fabricated from metal hydride material.

* * * * *